April 5, 1949.                H. A. KNOX ET AL                2,466,029
                 SUSPENSION SYSTEM FOR TRACK ADJUSTING IDLERS
                              Filed Aug. 21, 1945

INVENTORS
HARRY A. KNOX
RAYMOND I. STRICKLAND
BY
ATTORNEYS

Patented Apr. 5, 1949

2,466,029

UNITED STATES PATENT OFFICE 2,466,029

SUSPENSION SYSTEM FOR TRACK ADJUSTING IDLERS

Harry A. Knox, Washington, D. C., and Raymond I. Strickland, Greenbelt, Md.

Application August 21, 1945, Serial No. 611,902

8 Claims. (Cl. 305—1)

(Granted under the act of March 3, 1883, as amended April 30, 1928; 370 O. G. 757)

The invention described herein may be manufactured and used by or for the Government for governmental purposes without the payment to us of any royalty thereon.

This invention relates to a track-laying vehicle, such as for example tractors or combat vehicles, and more particularly to improvements in a track adjusting idler shaft where the use of a double track, i. e., two adjacent tracks on one side of the vehicle, or single track is used; and the objects of our improvements are, first, to provide a simple efficient means of adjusting tracks; second, to provide a variable adjustment with positive locking after adjustment with a minimum use of time and tools; third, to provide a coaxial interlocking unit that may be used with single or double track; and, fourth, to provide independent adjustment for either track without disturbing the other track.

In a track-laying vehicle, tracks propel the vehicle forward and backward. Drive sprockets pull the tracks from the rear and lay them down in front of the advancing suspension wheels. An adjustable idler is coaxially mounted on the idler wheels, located on each rearward side of the vehicle for adjusting the tension of the tracks referred to hereinafter.

One of the desirable properties in providing a vehicle with double track is to improve flotation, or, in other words, reduce ground pressure where uneven terrain or swampy ground is encountered. It also has an advantage in that it can be shipped to meet a maximum shipping width and then to exceed that width when the tracks are assembled on the vehicle in the field.

Two independently operated single tracks are presently to be employed on track-laying vehicles each track having its own individual idler shaft; but the use of a track adjusting idler shaft for two tracks supported intermediate its ends by a bracket and providing an independent adjustment for either track without disturbing the other track is believed to be new.

For the purpose of this application, we have elected to show herein certain forms and details of a track adjusting idler shaft representative of our invention; it is to be understood, however, that the embodiment of our invention herein shown and described is for the purpose of illustration only, and that therefore it is not to be regarded as exhaustive of the variations of the invention, nor is it to be given an interpretation such as might have the effect of limiting the claims short of the true and most comprehensive scope of invention in the art.

We attain these objects by mechanism illustrated in the accompanying drawing, in which, Figure 1 is an axially sectional view of a track adjusting idler shaft assembly with independent adjustment for double tracks, i. e., two adjacent tracks.

Figure 1:
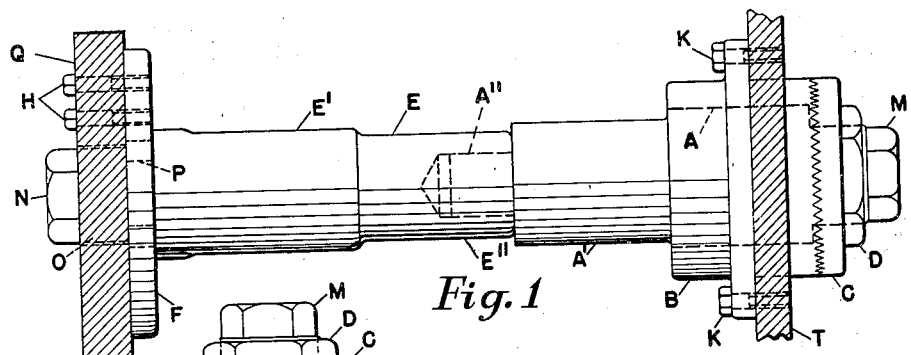
Figures 2, 3, 4:
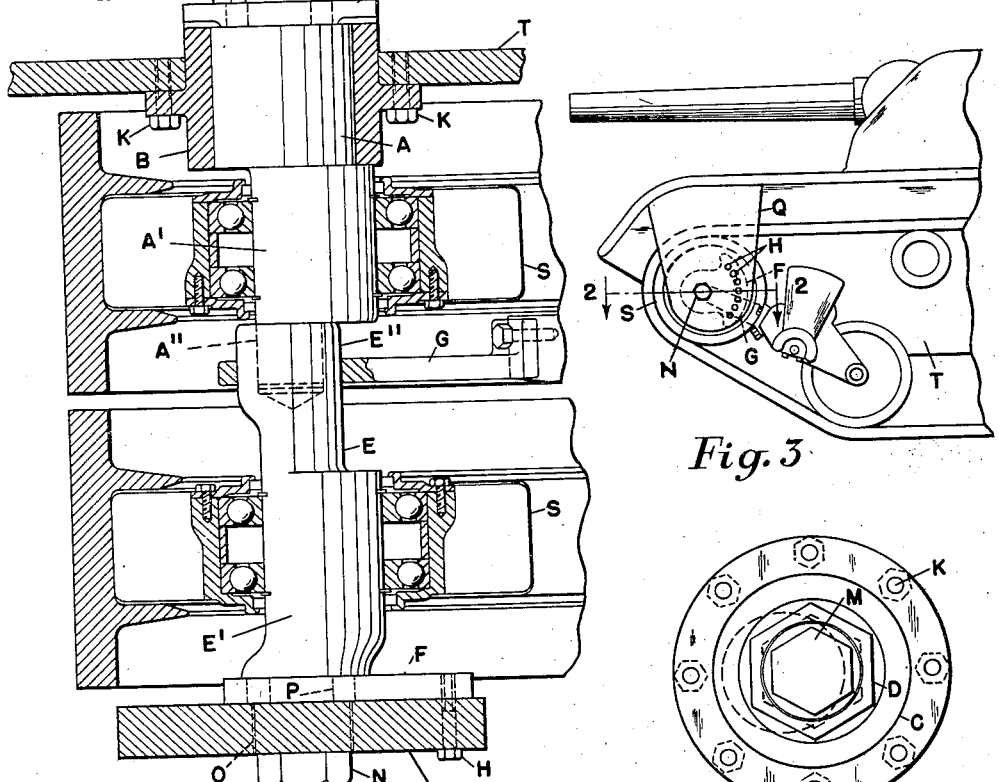
Figure 2 is a fragmental plan view taken substantially along line 2—2 of Figure 3 showing a double track with the track adjusting idler shaft assembly in its eccentric form and in interlocking and cooperative relation thereto.
Figure 3 is a right rearward side view of a track laying tank showing bracket Q in cooperative relation with respect to the idler wheel and a supporting bracket G shown in dotted lines which provides a bearing for the idler shaft.
Figure 4 is an end view of the variable adjustment end of the idler shaft.
Figure 5:
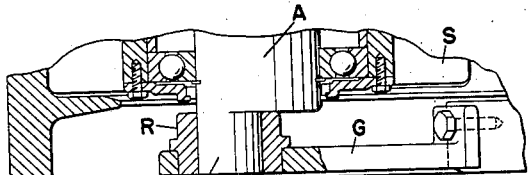
Figure 5 is a fragmental sectional view of a partial one-half portion primary shaft A of the track adjusting idler shaft assembly, for single tracks with bushing R, replacing shaft E.

With continued reference to the drawings wherein like reference characters have been employed to designate like parts throughout the several views thereof, the track adjusting idler shaft broadly comprises a primary eccentric shaft A having eccentric portion A' which is adjustable circumferentially to the axis of the idler wheel S by adjustably rotating shaft A which is supported by the flanged bracket B which in turn is supported by and secured to the hull or body of the vehicle T by means of a plurality of threaded studs K. One end of the shaft A has a hexagonal head M which is followed by a threaded portion that receives the nut D which is followed by a second hexagonal portion which fits the hexagonal hole in the serrated washer C which in turn engages the serrated end of the bracket B thus providing a positive means of locking the eccentric shaft A in the proper position after track adjustment by rotation of the shaft has been made. To provide for independent adjustment of double tracks, i. e., two adjacent tracks on one side of the vehicle as shown in Figure 2 with portions of the tracks bearing on idler wheels S shown in section, one end A'' of shaft A affords a bearing for the end E'' of the secondary eccentric shaft E which has eccentric portion E'. Both shafts are supported adjacent their junction by the bracket G. The outside end of shaft E also has a hexagonal head N followed by a bearing surface O which in turn is followed by a second hexagonal portion P which fits the hexagonal hole in the locking plate F.

A bearing for the shaft E is provided by the outer bracket Q of the vehicle T. The two threaded bolts H in the outer frame or hull are selectively engageable with two of the number of threaded holes in the locking plate F for locking it in the desired position of adjustment.

When single tracks are used shaft E is replaced by the bushing R which is circumferentially held secured to shaft A by the supporting bracket G.

By reason of our new and improved track adjusting idler shaft varied widths of tracks may be employed such as single narrow or wide track or where there are double tracks whether they be both narrow or both wide.

What we claim is:

1. In a track laying vehicle, a track adjusting idler comprising a shaft mounted on said vehicle, said shaft having an eccentric portion, an idler wheel rotatably mounted on the eccentric portion of said shaft, a second shaft mounted on said vehicle in axial alignment with said first mentioned shaft, said second shaft having an eccentric portion, an idler wheel rotatably mounted on the eccentric portion of said second shaft, and means for independently adjusting by relative rotation said first and said second shafts to independently adjust the position of either of said idler wheels.

2. In a track laying vehicle having two adjacent tracks on one side of the vehicle, a track adjusting idler shaft having two portions, each of said portions including an eccentric portion, an idler wheel rotatably mounted on each of said eccentric portions, and means to adjustably rotate one of said two portions with respect to the other of said shaft so that one track may be adjusted independently of the other track.

3. In a track laying vehicle having two adjacent tracks on one side of the vehicle, a track adjusting idler shaft comprising coaxial interengaging shafts, said shafts having an eccentric portion and being adjustable independently of the other; means for locking said shafts after independent adjustment, means for circumferentially supporting said shafts in proximity to their inner ends, and the hull of the said vehicle supporting said shafts at their outer ends.

4. A track idler adjuster for a vehicle, comprising coaxial interengaging idler shafts, said shafts having an eccentric portion thereon, means for adjusting one of said idler shafts independently of the other and means for mounting said shafts on said vehicle.

5. A track adjusting idler shaft for a double track vehicle, said track adjusting idler shaft having coaxial interengaging inner end portions, a male portion of one fitting into the female portion of the other; a supporting member for the said shaft, the said supporting member being in close proximity to the said coaxial interengaging inner end portions, both of the said portions having an eccentric, the said portions being adjustable independently of each other circumferentially about their axis and having their outwardly disposed ends mounted for rotation upon said vehicle.

6. A track adjusting idler shaft for a double track vehicle, said shaft having coaxial interengaging male and female portions, each of the said portions having an eccentric, the said portions at their outer ends being provided with independent variable adjustment, means for positively locking the said portions after said independent variable adjustment, means for circumferentially supporting said shaft in proximity to the said interengaging male and female portions, and the said interengaging male and female portions having their outwardly disposed ends mounted for rotation upon said vehicle.

7. In an idler shaft for a double track vehicle, comprising coaxial interengaging shafts, said shafts having an eccentric portion, means for circumferentially supporting said interengaging shafts in close proximity to their inner ends, said interengaging shafts at their outer ends being rotatively mounted on said vehicle, said interengaging shafts at their outer ends being variably adjusted circumferentially with respect to their axis independently of each other, and means for coaxial positive locking of said interengaging shafts after adjustment thereof.

8. In an idler shaft for a double track vehicle, comprising coaxial interengaging shafts, said shafts having an eccentric portion, an idler wheel, said shafts being adjustable independently and circumferentially to the axis of the said idler wheel, means for supporting said shafts circumferentially in proximity to their inner ends and means for supporting said shafts at their outer ends to the hull of the vehile.

HARRY A. KNOX.
RAYMOND I. STRICKLAND.

REFERENCES CITED

The following references are of record in the file of this patent:

UNITED STATES PATENTS

| Number | Name | Date |
|---|---|---|
| 844,892 | Pfander | Feb. 19, 1907 |
| 1,171,347 | Morse | Feb. 8, 1916 |
| 1,933,018 | Jobe | Oct. 31, 1933 |
| 2,393,993 | Knox | Feb. 5, 1946 |